PULSE SHAPING CIRCUITRY

Filed June 22, 1959

INVENTOR.
GLENN L. RICHARDS

BY F. H. Henson

ATTORNEY 3,015,741

PULSE SHAPING CIRCUITRY

Glenn L. Richards, Rochester, N.Y., assignor to General Dynamics Corporation, Rochester, N.Y., a corporation of Delaware Filed June 22, 1959, Ser. No. 821,995
5 Claims. (Cl. 307—88.5)

The present invention relates to pulse shaping circuitry.

It is an object of the present invention to provide simple and yet highly versatile pulse shaping circuitry.

It is a further object of the present invention to provide pulse shaping circuitry that may be utilized to convert input pulses to "sawtooth" pulses, elongated or "stretched" pulses, triangular pulses, or a "stairstep" waveform.

It is a still further object of the present invention to provide pulse shaping circuitry that may be utilized as a constant current D.C. source.

It is a principal feature of the present invention to provide an inductance which draws electrical energy from a source over a first loop having a first time constant and which releases electrical energy over a second loop having a second time constant, the ratio of the first and second time constants being controlled by variable resistors in the first and second loops to thereby produce output waveforms having various shapes depending upon the aforementioned ratio.

Another feature of the present invention according to the aforementioned feature, is the provision of a transistor having its emitter base circuit connected in series with the aforementioned first and second loops so that it is driven into saturation at a rate depending upon said first time constant and driven out of saturation at a lower rate depending upon said second time constant to thereby provide for the stretching of an input pulse delivering energy to the aforementioned inductance over the first loop.

Further objects, features and advantages of my invention will become apparent as the following description proceeds and the features of novelty which characterize my invention will be pointed out with particularity in the claims annexed to and forming a part of this specification.

Figure 1:
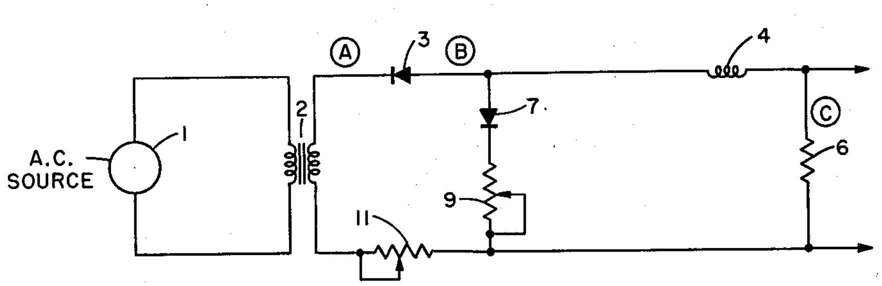
Figure 2:
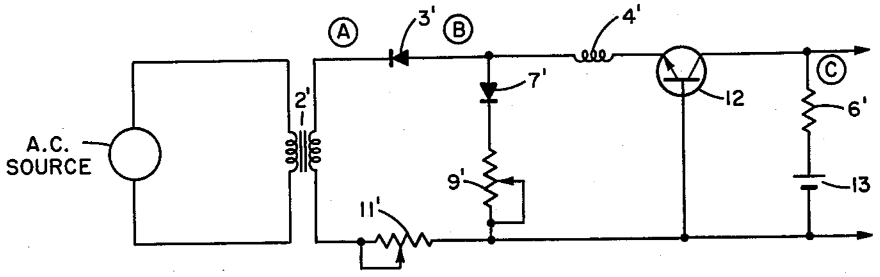
Figure 3:
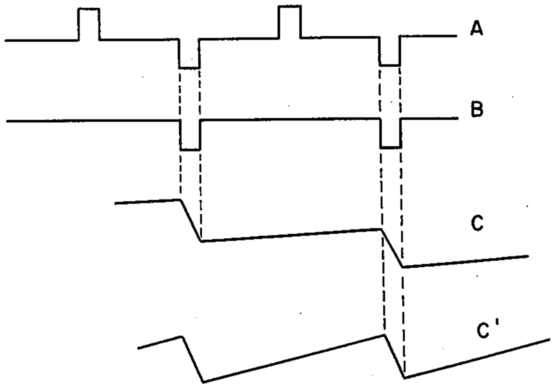
Figure 4:
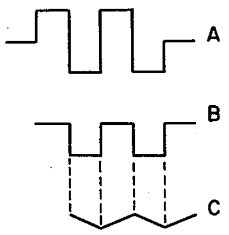
Figure 5:
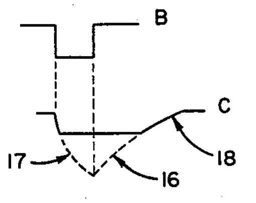

For a better understanding of my invention, reference may be had to the accompanying drawings of which:

FIGURE 1 discloses a first embodiment of the present invention;

FIGURE 2 discloses a second embodiment of the present invention which may be utilized as a pulse stretcher; and FIGURES 3 through 5 disclose the waveforms of signals present at various points in the circuits of FIGURES 1 and 2.

Referring now to FIGURE 1, an alternating current source 1 is disclosed connected to the primary winding of transformer 2. The signals produced across the secondary winding of transformer 2 are applied to the cathode of diode 3 at point A. Energy is drawn from A.C. source 1 by inductor 4 only when diode 3 is forward-biased; that is, when a negative signal is produced across the transformer secondary winding, and current flows through the outer loop comprising diode 3, inductor 4 and resistors 6 and 11. At these times, diode 7 is back-biased so that substantially no current flows through diode 7 or variable resistor 9. When diode 3 becomes back-biased upon the cessation of the negative signal at point A, the flux built up in inductor 4 commences to collapse. This generates a voltage across the inductor which forward-biases diode 7 so that current continues to flow through load resistor 6 and commences to flow through variable resistor 9 and diode 7.

It is well known that the time constant of a series circuit, having inductive impedance and resistive impedance only, is equal to the total inductance in the circuit divided by the total resistance of the circuit. Thus the average rate at which current increases in the outer loop of FIGURE 1, which comprises diode 3, inductor 4, load resistor 6, variable resistor 11, and the output winding of transformer 2, may be altered by changing the value of variable resistor 11. After diode 3 ceases to conduct, the collapsing field in inductor 4 initiates a current flow in the inner loop comprising inductor 4, load resistor 6, variable resistor 9 and diode 7 which decreases at an average rate which may be varied by changing the resistance of variable resistor 9.

If it is desired to produce a stairstep waveform disclosed at C in FIGURE 3, variable resistor 9 is adjusted so that it contributes very little resistance to the aforementioned inner loop. Variable resistor 11 is adjusted so that it contributes a substantial resistance to the outer loop. In this case since the total resistance of the outer loop is considerably greater than the total resistance of the inner loop, the time constant of the outer loop will be small compared to the time constant of the inner loop. Thus the slope of the voltage waveform produced across load resistor 6 will be relatively steep during the interval when inductor 4 is drawing current through the outer loop. However, when diode 3 becomes back-biased and diode 7 becomes forward-biased upon cessation of the negative pulse at point A, the average rate of decay of current presently flowing in the inner loop will be considerably smaller than the average rate of increase of current previously flowing through the outer loop, since the time constant of the inner loop is much greater than the time constant of the outer loop. As a result only a small amount of energy is released by inductor 4 and the slope of the waveform produced across load resistor 6 is very small in the interval between negative-going pulses. A burst of energy is again supplied to inductor 4 through the outer loop by the negative signal at point A and the flux previously developed in inductor 4 is considerably increased. This process continues to produce a stairstep output across load resistor 6.

If it is desired to produce sawtooth pulses shown at C′ in FIGURE 3, the resistance of variable resistor 9 is increased by merely adjusting its tap. This decreases the time constant of the inner loop to increase the average rate in which current decays in the inner loop during the interval between negative-going pulses, which in turn increase the slope of the trailing edge of the pulse produced across load resistor 6, so that a sawtooth pulse is generated for each negative input pulse as shown at C′ in FIGURE 3. It should be obvious that the slope of the leading edge of the sawtooth pulse may be changed by adjusting the tap of variable resistor 11, to change the time constant of the outer loop. The frequency of the A.C. pulse train generated by A.C. source 1 is high enough so that the circuit operates over small portions of the response curves of the inner and outer loops, and hence the leading and trailing edges of the pulses disclosed at C and C′ of FIGURE 3 are straight lines for all practical purposes.

If desired, the embodiment of FIGURE 1 may be utilized as a constant current D.C. source which is activated by an alternating current wave shape such as that shown at A in FIGURE 4. It should be understood that a sinusoidal or other A.C. input may also be utilized. Variable resistors 9 and 11 are adjusted so that the time constant of the outer loop is approximately equal to the time constant of the inner loop. Of course, it should be understood that if the resistance of the secondary winding of transformer 2, the inductance of inductor 4, and the resistances of diodes 3 and 7 are properly selected, variable resistances 9 and 11 may be eliminated. Due to the shape of the response curves of an R.-L. circuit, more energy will be inserted into the inductor 4 through the outer loop than is removed from the inductor through the inner loop for the first few cycles. After a number of cycles, equal amounts of energy will be inserted into the inductor through the outer loop and drawn out of the inductor through the inner loop per cycle. If the time constants of the inner and outer loops are large enough in relation to the duty cycle of A.C. source 1, the slopes of the leading and trailing edges of the triangular pulse produced across load resistor 6 as shown at C in FIGURE 4, will be extremely small so that for many applications, the output waveform will be sufficiently filtered direct current. The circuit is utilized as a constant current source in the solid state relay disclosed in application Serial No. 821,993, filed June 22, 1959, now Patent No. 2,976,431, and assigned to the same assignee as the present invention.

FIGURE 2 discloses a similar circuit to the circuit of FIGURE 1 except that a transistor 12 is added, having its emitter-base circuit connected between inductor 4′ and variable resistor 11′. The base-collector circuit of transistor 12 is connected in series with D.C. source 13 and load resistor 6′. Transistor 12 may be utilized merely as an amplifier to produce the waveshapes disclosed in FIGURES 3 and 4. In addition, with the proper selection of circuit parameters, the circuit of FIGURE 2 may act as a pulse stretcher. Inductor 4′ draws and releases energy through similar outer and inner loops as in the circuit disclosed in FIGURE 1, these loops including the emitter-base circuit of transistor 12. Transistor 12 is selected so that it is driven into saturation shortly after current commences to flow through the outer loop comprising diode 3′, inductor 4′, the emitter-base circuit of transistor 12, variable resistor 11′ and the secondary winding of transistor 2′. Current continues to build up in the loop as shown by dotted line 17 in FIGURE 5 until the negative-going pulse at point A ceases. Thereafter, current commences to flow through the inner loop comprising inductor 4′, the emitter-base circuit of transistor 12, variable resistor 9′ and diode 7′ and decays as shown by the dotted line 16 of FIGURE 5. Finally, the current flowing in the emitter-base circuit of transistor 12 is reduced below that current required to maintain the transistor in the saturated state, and the trailing edge 18 of the output pulse taken across load resistor 6′ is formed. By changing the time constant of the inner loop with respect to the outer loop, the degree of elongation of the input pulse shown at B, FIGURE 5, may be controlled. For instance, a decrease in the resistance of variable resistor 9′ causes a decrease in the slope of dotted line 16 disclosed in FIGURE 5, so that the transistor is held in a state of saturation for a longer period, which in turn causes the output pulse to be further stretched or elongated.

While I have shown and described a specific embodiment of my invention, other modifications will readily occur to those skilled in the art. I do not therefore desire my invention to be limited ot the specific arrangement shown and described, and I intend in the appended claims to cover all modifications within the spirit and scope of my invention.

What is claimed is:

1. A pulse shaper comprising, a source of fluctuating D.C. having a pair of output terminals, a first series circuit comprising an inductor and a load impedance, means for coupling said first series circuit across the output terminals of said source of fluctuating D.C., a second series cricuit comprising a diode and a potentiometer, and means for coupling said second series circuit across the output terminals of said source of fluctuating D.C.

2. A pulse shaper comprising, a source of fluctuating D.C. having a pair of output terminals, a first circuit comprising an inductor and a load impedance connected in series, means for coupling said first circuit across the output terminals of said source of fluctuating D.C. to form a first loop, a second circuit including a diode, means for coupling said second circuit across the output terminals of said source of fluctuating D.C. so that said first and second circuits form a second loop, and means for changing the time constant of one loop relative to the time constant of the other loop.

3. A pulse shaper comprising, a source of fluctuating D.C. having a pair of output terminals, a translating device having a control circuit and an output circuit, a load impedance and a source of bias voltage coupled to the output circuit of said translating device, a first series circuit comprising an inductor and the control circuit of said translating device, means for coupling said first series circuit across the output terminals of said source of fluctuating D.C., a second series circuit comprising a diode and a potentiometer, and means for coupling said second series circuit across the output terminals of said source of fluctuating D.C.

4. A pulse shaper comprising, a source of fluctuating D.C. having a pair of output terminals, a translating device having a control circuit and an output circuit, a load impedance and a source of bias voltage coupled in the output circuit of said translating device, a first circuit comprising an inductor and the control circuit of said translating device, means for coupling said first circuit across the output terminals of said source of fluctuating D.C. to form a first loop, a second circuit comprising a diode, means for coupling said second circuit across the output terminals of said source of fluctuating D.C. so that said first and second circuits form a second loop, and means for changing the time constant of one loop relative to the time constant of the other loop.

5. In combination, a pair of terminals, a time constant circuit connected across said terminals, said time constant circuit including solely a serially connected inductance and resistance, means for intermittently applying a voltage of a given polarity across said terminals whereby during the presence of said voltage a current flows in a given direction through said time constant circuit and energy is stored by said inductance, and polarized switching means connected across said terminals for short-circuiting said terminals in response to the removal of said voltage of a given polarity being applied thereacross whereby during the absence of said voltage said inductance releases said stored energy and current commences to flow in said given direction through said time constant circuit and through said polarized means.

References Cited in the file of this patent

UNITED STATES PATENTS

| | | |
|---|---|---|
| 2,227,480 | Andrieu | Jan. 7, 1941 |
| 2,396,476 | Schade | Mar. 12, 1946 |
| 2,462,918 | Stiefel | Mar. 1, 1949 |
| 2,616,044 | Schelesinger | Oct. 28, 1952 |
| 2,896,115 | Guggi | July 21, 1959 |
| 2,902,609 | Ostroff | Sept. 1, 1959 |